(12) United States Patent
Huber

(10) Patent No.: US 6,209,584 B1
(45) Date of Patent: Apr. 3, 2001

(54) METHOD AND APPARATUS FOR REMOVAL OF FLUID CONDUIT TEST BAFFLE

(76) Inventor: Donald G. Huber, P.O. Box 64160, Tacoma, WA (US) 98464

(*) Notice: Subject to any disclaimer, the term of this patent is extended or adjusted under 35 U.S.C. 154(b) by 0 days.

(21) Appl. No.: 09/432,648

(22) Filed: Nov. 2, 1999

Related U.S. Application Data (60) Provisional application No. 60/106,890, filed on Nov. 3, 1998, and provisional application No. 60/148,364, filed on Aug. 11, 1999.

(51) Int. Cl.$^7$ .................................................. F16L 55/12
(52) U.S. Cl. ................................. 138/89; 138/93; 138/90; 73/49.8
(58) Field of Search ................................. 138/90, 94, 89, 138/94.3, 93; 73/49.8

(56) References Cited

U.S. PATENT DOCUMENTS

| | | |
|---|---|---|
| 1,720,819 | 7/1929 | Cohen . |
| 1,948,220 | 2/1934 | Kennedy ................................. 182/7 |
| 2,279,257 | 4/1942 | Svirsky ................................. 138/90 |
| 2,299,116 | 10/1942 | Svirsky ................................. 138/90 |
| 2,299,434 | 10/1942 | Svirsky ................................. 138/90 |
| 2,927,609 * | 3/1960 | Vander Lans ....................... 138/94 X |
| 3,091,259 | 5/1963 | Alessio ................................. 138/90 |
| 3,154,106 | 10/1964 | Nooy ..................................... 138/94 |
| 3,241,571 | 3/1966 | Garcia ................................. 138/90 |
| 3,327,379 | 6/1967 | Clements ................................. 29/450 |
| 3,442,295 * | 5/1969 | Ver Nooy .............................. 138/94 |
| 3,457,959 | 7/1969 | Cooper ................................. 138/90 |
| 3,467,271 | 9/1969 | Kaiser et al. ........................ 220/24.5 |
| 3,941,156 | 3/1976 | Metzger ................................. 138/90 |
| 4,040,450 * | 8/1977 | Boundy ................................. 138/94 |
| 4,064,912 * | 12/1977 | Petrone ................................. 138/94 |
| 4,168,621 | 9/1979 | Kreitenberg ........................ 73/40.5 R |
| 4,194,721 | 3/1980 | Nachtigahl .......................... 251/148 |
| 4,202,377 * | 5/1980 | Harrison ................................ 138/94 |
| 4,203,473 | 5/1980 | Roberson, Sr. ......................... 138/93 |
| 4,306,447 | 12/1981 | Franks, Jr. ............................... 73/46 |
| 4,376,597 | 3/1983 | Britton et al. ......................... 405/195 |
| 4,429,568 | 2/1984 | Sullivan ................................. 73/49.8 |
| 4,542,642 | 9/1985 | Tagliarino ........................... 73/40.5 R |
| 4,602,504 | 7/1986 | Barber ................................. 73/49.8 |
| 4,607,664 | 8/1986 | Carney et al. ......................... 138/89 |
| 4,658,861 | 4/1987 | Roberson, Sr. ......................... 138/90 |
| 4,706,482 | 11/1987 | Barber ................................. 73/49.8 |
| 4,763,510 | 8/1988 | Palmer ............................... 73/40.5 R |
| 4,848,155 | 7/1989 | Huber ................................. 73/49.8 |
| 4,936,350 | 6/1990 | Huber ................................. 138/90 |
| 5,033,510 | 7/1991 | Huber ................................. 138/90 |
| 5,076,095 | 12/1991 | Erhardt ................................. 73/49.8 |
| 5,163,480 | 11/1992 | Huber ................................. 138/94 |
| 5,297,581 * | 3/1994 | Godfrey ................................. 138/94 |
| 5,740,830 | 4/1998 | Mankins ................................. 137/15 |

FOREIGN PATENT DOCUMENTS 313441  5/1956  (CH) .

* cited by examiner

Primary Examiner—Patrick Brinson
(74) Attorney, Agent, or Firm—Garrison & Associates PS; David L. Garrison (57) ABSTRACT

Method and apparatus for dislodging a test baffle in a fluid conduit following pressure testing without permitting fluid to escape. The invention provides a device for dislodging or unseating a test baffle, for releasing a pressure within the conduit contained by the baffle, and for removing the baffle without leakage or other fluid escape. A preferred apparatus according to the invention comprises a rigid plug adapted for sealing engagement of an end of a fluid conduit such as a pipe, and a removal device adapted to pass through an aperture in said plug and to engage and dislodge a test baffle disposed within an interior of the conduit. Preferred removal devices comprises flexible lines attached to the test baffle and tools adapted to pass through the aperture and engage the test baffle. A method aspect of the invention comprises the steps of substantially blocking or sealing an end of a fluid conduit with a plug, passing a removal device through an aperture in the plug, and using the removal device to unseat or dislodge a test baffle in the interior of the conduit.

21 Claims, 8 Drawing Sheets

METHOD AND APPARATUS FOR REMOVAL OF FLUID CONDUIT TEST BAFFLE

This application claims the benefit of U.S. Provisional Patent Applications Ser. No. 60/106,890, filed Nov. 3, 1998, and entitled Method and Apparatus for Removal of Fluid Conduit Test Baffle; and Ser. No. 60/148,364, filed Aug. 11, 1999, and entitled Method and Apparatus for Removal of Fluid Conduit Test Baffle.

TECHNICAL FIELD

The invention relates to the testing of pipes and other fluid transfer lines for leaks. More particularly, it relates to method and apparatus for removing or dislodging test baffles in fluid conduits following pressure testing. A principal application of the invention is in the testing of drain systems and other building plumbing lines.

BACKGROUND OF THE INVENTION

In the construction of buildings and mechanical systems, a newly installed or repaired fluid transfer system or system component, as for example a building plumbing or sewage system, must frequently be isolated from a larger system until the fluid-tight integrity of the new section is tested, generally by subjecting the system to an increased fluid pressure to locate any leaks. In building construction, system tests of this kind are often required as a condition of certification of compliance with building code requirements. The inherent difficulty of making pressure tests of this type is often aggravated by the fact that some portion of the new installation is embedded in a wall or is buried, obstructed by other components, or otherwise difficult to access at the time the test is conducted. Thus a vexing question has been posed by the need to seal selected portions of such systems in order to accommodate testing without permanent obstruction or other damage to the system.

Several solutions to the problems of completing such tests have been offered, including those disclosed in my own previous U.S. Pat. No. 4,848,155, 4,936,350, 5,033,510, and 5,163,480, and in my previous patent applications Ser. No. 60/092,313, filed Jul. 9,1998 and entitled Water Closet Fitting with Test Baffle; Ser. No. 60/092,322, filed Jul. 9, 1998 and entitled Water Closet Fitting Installation Assembly; Ser. No. 60/093,682, filed Jul. 22, 1998 and entitled Test System for Fluid Tight Integrity of Installed Pipeline; and Ser. No. 60/102,372, filed Sep. 29, 1998 and entitled Test Assembly for Fluid Tight Integrity of Pipeline Joint. The disclosures of each of these patents and patent applications is incorporated herein by this reference as if set forth in full.

Each of the incorporated references discloses systems for the leak or pressure testing of pipelines and other fluid conduits, the systems comprising removable test baffles adapted to seal off portions of the fluid conduits and later to be removed without permanently obstructing or damaging the fluid systems. When making tests by means of such baffles, it is frequently advantageous to be able to dislodge, unseat, or remove the test baffle without permitting fluid within the system to leak while the system remains sealed. That is, it is frequently advantageous or important to accomplish the release of pressure within that portion of the conduit which has been tested, or the removal of the test baffle, or both, while the system is sealed without allowing the discharge of significant or uncontrolled amounts of fluid. It is also advantageous to be able to remove the tool or device by which the baffle is unseated or dislodged without having to open the system or permit leakage or drainage therefrom. Several means for accomplishing the unseating of test baffles have been suggested—particularly in the incorporated references—but they do not in general provide a means for doing so without leakage or other release of fluids, or for the removal of unseating tools without leakage. For example, several of the systems disclosed are best suited to use with an open free end of a conduit, as for example an open end of an uncompleted pipeline, or require opening of the system to remove the dislodging tool. Others of the systems provide for access from Y-joints or cleaning or maintenance points, but only with the end plates or covers removed.

Sullivan, U.S. Pat. No. 4,429,568, discloses a closure plug assembly for pressure testing liquid drain and vent plumbing pipe systems. Tagliarnio, U.S. Pat. No. 4,542,642, discloses a test tee having a plug which is a removable blocking disk. Ver Nooy, U.S. Pat. No. 3,154,106, discloses a pipeline plugger. Svirsky, U.S. Pat. Nos. 2,279,257; 2,299,116, and 2,299,434 disclose various plugs and closure means for conduits. Fischer, Swiss patent No. 313,441, discloses a test plug for a Y-shaped, dimpled pipe. Roberson, U.S. Pat. Nos. 4,203,473 and 4,658,861, discloses plug assemblies. Each of the above references, however, requires removal of a plug or other test fixture to facilitate removal of the dislodging tool. Many of the tools, moreover, do not permit dislodging or unseating of the test plugs, or the release of test pressures within the system, without venting the system and opening possibilities for leakage or other drainage.

Another difficulty with making tests of the type described is that a single tester is often required, over the course of hours, days, weeks, or even longer periods, to test portions of systems which comprise conduits of differing inside diameters. For example, most fluid conduit systems such as building plumbing and pneumatic systems use conduits of differing, but standard, diameters. In building construction, for example, pipe diameters varying between ½" and 6" are common, and are frequently used within the same building in different portions of the same plumbing systems. The advantage of having a single test plug or system which would permit testing of two or more standard conduit sizes, without changes or modifications to the plug, is clear: the tester is able to perform the same function while carrying fewer plugs, and therefore has less weight and fewer components to transport. Convenience, safety, and economy are all improved.

None of the prior art references discussed herein discloses a test plug adapted for sealing the end of 2 or more pipes of differing diameter, so that the burden of carrying multiple test plugs is imposed upon the users of such systems. Given the bulk and weight of such plugs, and the desirability of making test equipment easily portable, it may be seen that any requirement for carrying multiple test plugs is to be avoided.

Thus there is a need for a test plug or cap which will permit dislodging of a test baffle for a system for the non-destructive and non permanently-obstructing testing of the fluid tight integrity of an installed fluid transfer line such as a drain pipe or vent and wastewater system of a building, the test baffle being disposed within a sealed or substantially sealed fluid conduit, without removal of the plug and without leakage or other drainage from the fluid system after the test has been completed. There is a further need for such a test cap which will permit removal of the dislodging tool without removal of the cap and without such leakage or drainage. There is still further need for such a test plug or cap which is suitable for use with a plurality of standard-sized fluid conduits. It is further desirable that such a test plug or cap not require the employment of a T- or Y-fitting for access to or removal of the test baffle, or separate access covers, and that it not require the replacement of parts or seals following completion of the test or the use of pneumatic or otherwise inflatable apparatus in performing the test.

DISCLOSURE OF THE INVENTION

Thus it is an object of the invention to provide a test plug or cap which will permit dislodging of a test baffle for a system for the non-destructive and non permanently-obstructing testing of the fluid tight integrity of an installed fluid transfer line such as a drain pipe or vent and wastewater system of a building, the test baffle being disposed within a sealed or substantially sealed fluid conduit, without removal of the plug and without leakage or other drainage from the fluid system after the test has been completed. It is a further object of the invention to provide such a test cap in a form which will permit removal of the dislodging tool without removal of the cap and without such leakage or drainage. It is a still further object of the invention to provide such a test plug or cap in a single form which is suitable for use with aplurality of standard-sized fluid conduits. It is also an object of the invention to provide such a test plug or cap in a form which does not require the employment of a T- or Y-fitting for access to or removal of the test baffle, or separate access covers, and which does not require the replacement of parts or seals following completion of the test or the use of pneumatic or otherwise inflatable apparatus in performing the test.

It is yet another object of the invention to meet any or all of the needs summarized above. These and such other objects of the invention as will become evident from the disclosure below are met by the invention disclosed herein.

The invention comprises method and apparatus for dislodging a test baffle in a fluid conduit following pressure testing without permitting fluid to escape. The invention provides a device to dislodge or unseat a test baffle, to release a pressure within the conduit contained by the baffle, and to remove the baffle without leakage or other fluid escape from the tested conduit. A preferred apparatus according to the invention comprises a rigid end plug or cap (the terms as used herein are synonymous) adapted for sealing engagement of an end of a fluid conduit such as a pipe, and a removal device adapted to pass through an aperture in said plug and to engage and dislodge a test baffle disposed within an interior of the conduit. Preferred removal devices comprise flexible lines attached to the test baffle and tools adapted to pass through the and engage the test baffle, either directly or indirectly. A method aspect of the invention comprises the steps of substantially blocking or sealing an end of a fluid conduit with a plug, passing a removal device through an aperture in the plug, and using the removal device to dislodge a test baffle in the interior of the conduit. In removing baffles comprising attached lines, the removal method comprises the step of taking up slack in the removal line by winding or rotating the removal tool.

In one aspect the invention provides apparatus for dislodging a test baffle in a fluid conduit. The apparatus comprises a plug or cap adapted for sealing engagement of an end of a fluid conduit and a removal device adapted to pass through an aperture in the cap and to engage and dislodge a test baffle disposed within an interior of the fluid conduit.

The plug is generally rigid and of substantially circular cross section, in order to facilitate mating of the plug with fluid lines of circular section and to enable it to serve the purposes described herein. The plug comprises an aperture (that is, a hole, port, slit, crack, gap, channel or the like) communicating between an outer surface of the plug and the interior of the conduit, so as to allow the removal device to move through the cap or to be manipulated inside the fluid conduit. The aperture may pass advantageously through either the central portion or an edge of the plug. The plug is generally adapted for removable attachment to the fluid system, as for example by means of threads, bolts, or friction fit between the edges of the plug and the interior or exterior of the fluid conduit. Preferred embodiments of the plug are adapted to sealingly engage the ends of conduits of multiple sizes, as for example, 3", 4", and 5" diameter pipe. This is accomplished by providing the plug with a tapered, frusto-conical shape sized for frictional fit with the inner surfaces of the ends of the pipe, or by providing the plug with stepped or offset cylindrical sections of progressively increasing threaded circumference, of appropriate size for threading into the ends of pipes of multiple sizes, or other similar methods.

The removal device according to this aspect of the invention is adapted to pass through the plug aperture so as to either directly (as for example by means of a tool which hooks or otherwise engages the baffle) or indirectly (as for example by use of an intermediate line or cord) engage a test baffle disposed within an interior of said fluid conduit. Manipulation of the removal device then allows dislodging of the baffle from it seat, so as to breach the seal between the baffle and the conduit within which it is located, so as to release pressure within the conduit and to allow fluid behind the baffle to drain off under some measure of control, so that the baffle may be removed from the conduit without sudden or explosive release of fluid and pressure. One preferred embodiment of a removal device according to this aspect of the invention comprises a flexible line attached to the test baffle, typically by use of a lug and various pull rings or tabs, etc. The line passes from its attachment to the baffle, through the aperture in the plug, to the exterior of the fluid system so that pulling on the line unseats the baffle and permits drainage of fluid behind the baffle.

An alternative preferred embodiment of the removal device comprises a tool adapted to pass through said aperture, a first end of the tool comprising a device for either directly or indirectly engaging, and dislodging, a test baffle disposed within an interior of a fluid conduit; and a second end of the tool being adapted for manipulation of the first end, so as to permit engagement and dislodging of the tool when the tool is disposed within the aperture, so that the first end of the removal tool may be manipulated into engagement with the baffle when the baffle is installed within the interior of the conduit, and the baffle may be dislodged or unseated from the conduit. A particularly advantageous method for using tools of this type is to engage a line or loop attached to the test baffle, and typically hanging free therefrom, with an end of the tool, and then to twist or rotate the tool about its longitudinal axis in such a manner as to tighten the loop and remove the slack therefrom, and then to rotate the end of the tool, using the plug aperture as a fulcrum, so as to unseat or dislodge the baffle. Thus a tool according to this aspect of the invention preferably comprises a longitudinal axis, and is adapted for rotation thereabout within the plug aperture, and further comprises a hook adapted for engagement of a line attached to a test baffle, whereby the tool may be rotated about said longitudinal axis in order to remove a slack from said line prior or during dislodgment of said baffle.

It has been found advantageous in practicing this aspect of the invention to provide the plug with a skirt enclosing the aperture within the plug and providing a seal between the plug and the removal device. Such skirts are preferably made from water resistant or treated fabrics, elastomeric polymers, rubber, and the like, and are attached circumferentially about the aperture to the plug, and are gathered about a portion the removal device. Use of such skirts serves to reduce or prevent leakage from the aperture during dislodgement of the baffle from the conduit.

In another aspect the invention comprises apparatus consisting of the combination of a plug and removal tool of the types described herein. Such combinations optionally comprise skirts and other preferred adaptations described herein, including provision for the engagement by a single plug of a plurality of conduits of differing inside diameter.

In another aspect the invention comprises method for dislodging a test baffle in a fluid conduit. In one embodiment the method comprises the steps of substantially blocking or sealing an end of a fluid conduit with a plug, passing a removal tool through an aperture or port communicating between an outer surface of the plug and an interior of the conduit, and into the interior of the fluid conduit; manipulating a first end of the removal tool, generally by use of a second end of the removal tool, into engagement of a removal device of a test baffle installed within the interior; and dislodging the baffle from the conduit by use of the removal tool. In applying the method to test systems in which the removal device of the test baffle comprises a lug and the removal tool comprises a hook, the engagement optionally comprises the passing an end of the hook through the lug, so as to facilitate dislodging of the baffle by manipulation of the tool. In applying the method to test systems in which the removal device of the test baffle comprises a loop and the removal tool comprises a device, such as a hook or suitably slotted protrusion, for engaging the loop, the method optionally comprises the step of rotating the removal tool to wind a portion of said loop about the tool so as to reduce an effective length of the loop, or to take up slack in the loop, to facilitate dislodgement of the baffle by manipulation of the tool. Preferably all such methods comprise the additional step of breaching a seal between the baffle and the conduit to release pressure within the conduit.

In an alternative preferred embodiment the method aspect of the invention comprises the steps of substantially blocking or sealing an end of a fluid conduit with a plug; passing a removal device comprising a line through an aperture or port communicating between an outer surface of the plug and an interior of the conduit, and into the interior of the fluid conduit, the removal device attached to a test baffle; and dislodging the baffle from the conduit by use of the removal device. Optionally the method comprises the additional step of taking up slack within the line and dislodging the baffle at least partly by use of a rod, as for example rotating the rod to wind the line about the rod and thereafter manipulating the rod to dislodge the baffle.

It has been found that the performance of the test plugs, assemblies, and systems as disclosed herein in facilitating removal of test baffles during or after testing of fluid conduits without leakage of fluids used in the testing can be improved by providing the test baffle itself with a portion adapted to sealingly engage the aperture in the test plug after the test baffle has been unseated, by drawing the baffle and the attachment portion into engagement with the aperture. Causing the attachment portion to plug the aperture prevents leakage of test fluid through the aperture. This result is effectively achieved by providing an attachment between the attachment portion and the removal device, so that when the removal device is drawn through the aperture after the test baffle has been unseated the attachment portion is drawn into the aperture behind the removal device. Thus a preferred embodiment of the invention optionally comprises an aperture adapted to receive in sealing engagement an attachment portion of a test baffle, the attachment portion preferably being attached to the removal device and adapted to sealingly engage the aperture upon being drawn into the aperture by the removal device. Similarly, preferred embodiments of the plug aspect optionally include embodiments adapted for sealing engagement of an end of a fluid conduit, the plug comprising an aperture communicating between an outer surface of the plug and an interior of the conduit and being adapted for sealing engagement of a plurality of conduits, the conduits being of differing inside diameter and the aperture being adapted to receive in sealing engagement an attachment portion of a test baffle. Likewise, method aspects of the invention include the steps of removing the test baffle and drawing the attachment portion into sealing engagement with the aperture, as described.

In yet another aspect the invention provides a test baffle of the type described, the test baffle adapted for sealing engagement of an interior of a conduit, thereby to facilitate testing of the fluid-tight integrity of a portion of the conduit on a sealed side of the baffle. A preferred embodiment of the test baffle aspect of the invention comprises a perimeter, a web, and a lug or other attachment portion adapted for engagement of a removal device. In preferred embodiments of the test baffle aspect of the invention the attachment portion is adapted for sealing engagement of an aperture in a test plug after the test baffle has been unseated, generally by drawing the baffle and the attachment portion thereof into engagement with the aperture. Causing the attachment portion to plug the aperture prevents leakage of test fluid through the aperture as the test portion of the conduit is drained. This result is effectively achieved by providing an attachment between the attachment portion and the removal device, so that when the removal device is drawn through the aperture after the test baffle has been unseated the attachment portion is drawn into the aperture behind the removal device.

BEST MODE OF CARRYING OUT THE INVENTION

For purposes of this disclosure, fluid includes any aggregation of matter in which the molecules are able to flow past each other without limit and without the formation of fracture planes, or which is capable of flowing and which changes shape steadily when acted upon by a force tending to change its shape, and includes, without limitation, any liquid or gas.

Fluid line means any pipe, tube, conduit, duct, or other fixed vehicle for the transportation or guided transfer of a fluid.

Test baffles suitable for use with the invention include but are not limited to those described in my patent provisional patent applications Ser. No. 60/093,682, entitled Test System for Fluid Tight Integrity of Installed Pipeline and filed Jul. 22, 1998; Ser. No. 60/093,682, entitled Test System for Fluid Tight Integrity of Installed Pipeline, filed Jul. 22, 1998; Ser. No. 60/102,372, filed Sep. 29, 1998, and entitled Test Assembly for Fluid Tight Integrity of Pipeline Joint; and Ser. No. 60/120,523, filed Feb. 17, 1999, and entitled Test Assembly for Fluid Tight Integrity of Pipeline Joint; and in my utility patent applications Ser. No. 09/350,786, filed Jul. 9, 1999 and entitled Test System for Fluid Tight Integrity of Installed Pipeline; and Ser. No. 09/357,667, filed Jul. 20, 1999 and entitled Test Assembly for Fluid Tight Integrity of Pipeline Joint; the specifications of each of where are hereby incorporated as if set out in full. Other suitable baffles are also known in the art. Any baffle suitable for the uses described herein will serve.

Turning now to the drawings, the invention will be described in a preferred embodiment by reference to the numerals of the drawing figures wherein like numbers indicate like parts.

Figure 1A:
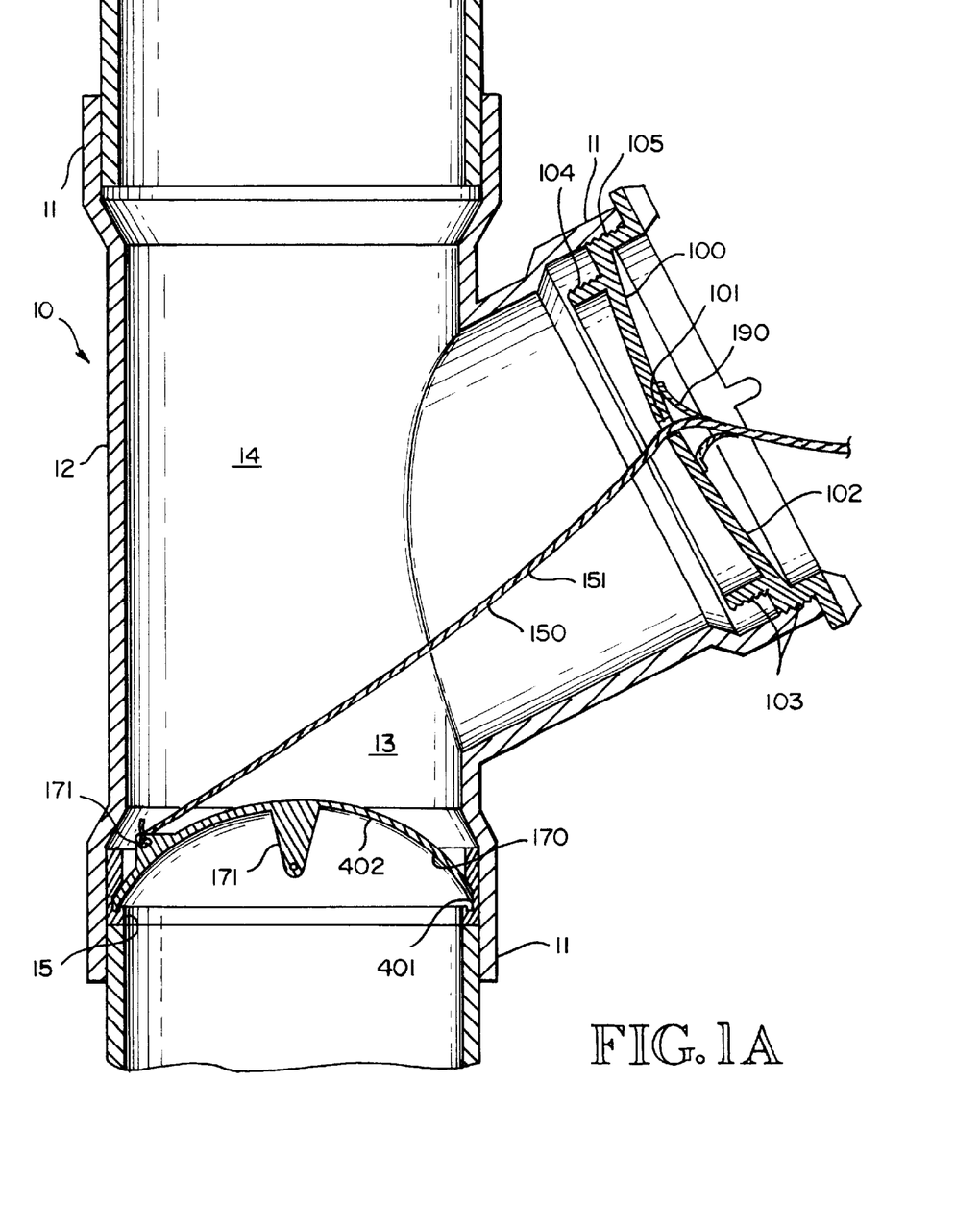
FIG. 1a is a cutaway schematic view of a preferred embodiment of an apparatus for unseating a test baffle according to the invention, with the test baffle in place for a conduit test.

FIG. 1a is a cutaway schematic view of a preferred embodiment of an apparatus for unseating a test baffle according to the invention, with the test baffle in place for a conduit test. Apparatus 10 comprises plug 100 and removal device 150. Plug 100 is in sealing engagement with one end 11 of fluid conduit 12, while removal device 150 passes through aperture 101 in plug 100 to engage test baffle 170, which is disposed within interior 13 of fluid conduit 12 so as to block of a portion of the conduit for pressure or leakage testing. Aperture 101 communicates between outer surface 102 of plug 100 and interior 13 of conduit 12, so as to allow insertion and manipulation of removal device 150. Sealing engagement of conduit 12 by plug 100 is accomplished by use of threads 103, which comprise two thread sets 104 and 105 adapted for engagement of conduits of different sizes. In the embodiment shown, removal device 150 comprises flexible line 151, fabricated from string, cord, or threads of natural or synthetic fibers., attached to attachment portion 171 on test baffle 170.

Test baffle 170, and optionally (as in the embodiment depicted) test plug 100 seal a portion of conduit 12 in which leakage or pressure testing is to be performed. Sealing around aperture 101 is aided by provision of optional skirt 190. Skirt 190 is generally comprised of flexible fabric, either synthetic or natural, and is adapted to complete or improve the seal provided by plug 100. In the embodiment shown in FIG. 1a, skirt 190 is attached to outer surface 102 of plug 100, and gathered together about removal device 150, which is comprised of flexible line 151.

Test baffle 170 comprises perimeter 401, web 402, and attachment portion 171. Baffle 170 is adapted for sealing engagement of interior 13 of conduit 12, thereby to facilitate testing of the fluid-tight integrity of portion 14 of the conduit on the sealed side of the baffle. Attachment portion 171 is adapted for engagement of removal device 150. In preferred embodiments sealing engagement between baffle 170 and conduit 12 is provided by perimeter 401, while web 402 of the baffle is concave to facilitate operation as described herein.

Figure 1B:
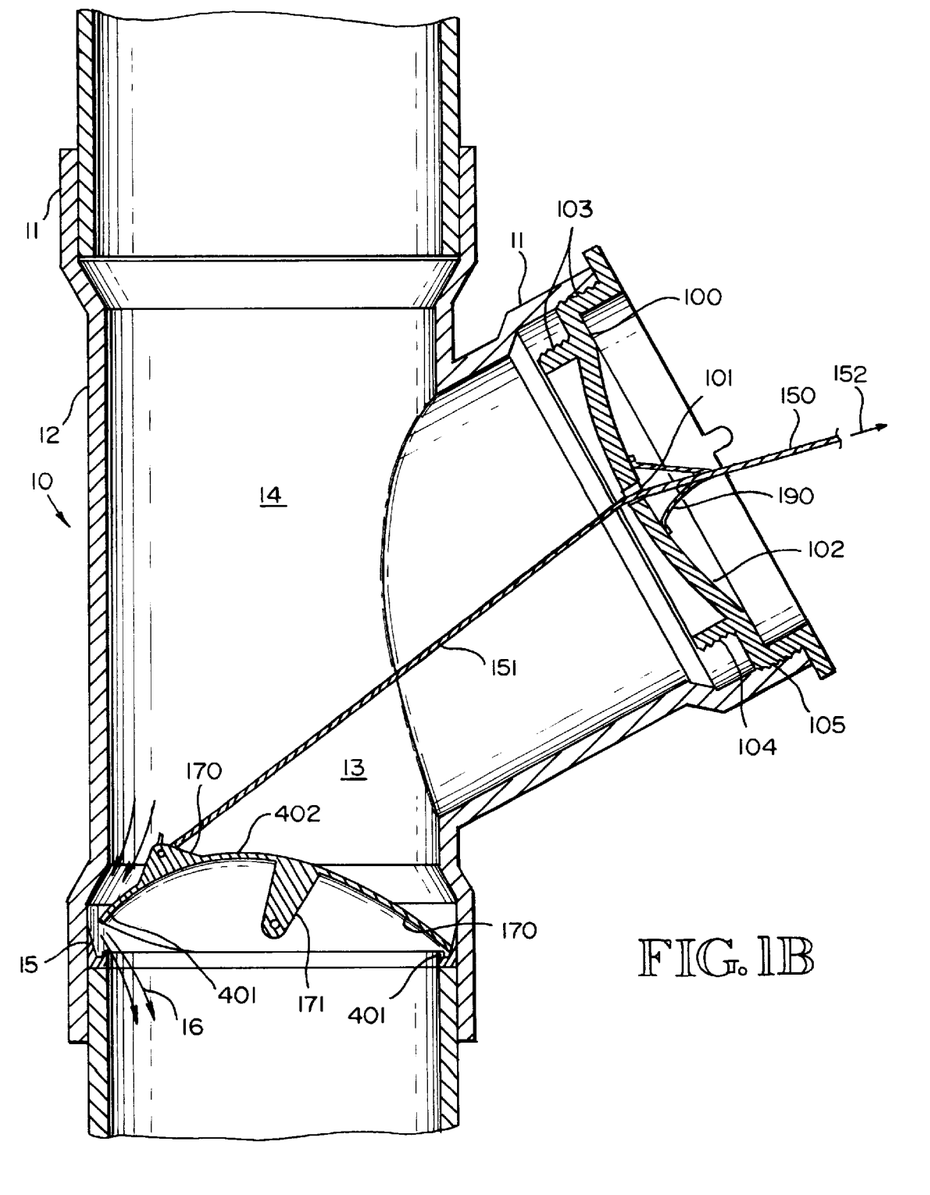
FIG. 1b is a cutaway schematic view of a preferred embodiment of an apparatus for unseating a test baffle according to the invention, with the test baffle dislodged to allow bleed off of pressure in the test section.

Operation of the preferred embodiment of the invention depicted in FIG. 1a is shown in FIG. 1b. In FIG. 1a, test portion 14 of interior 13 of fluid conduit 12 contains fluid retained by baffle 170 and plug 100. In FIG. 1b removal device 150 has been manipulated to dislodge baffle 170 from its seat 15 within fluid conduit 12 by disengaging perimeter 401 of the baffle from conduit 12. In the embodiment shown, this is accomplished by pulling flexible line 151 in the direction of arrow until the tension in line 151 is sufficient to dislodge the test baffle (that is, to disengage perimeter 401 or otherwise unseat the baffle), permitting the fluid in test portion 14 to bleed off in the direction of arrows 16. In FIG. 1b, the test fluid is allowed to bleed off into continuing portions of conduit 12; as an alternative the test fluid may be allowed to vent or drain to the exterior of the conduit. After pressure has been bled off or the test portion has been allowed to drain, plug 100 may be removed from end 11 of conduit 12 so that the baffle may be removed without undesired escape of fluids from the conduit.

Figures 2, 3:
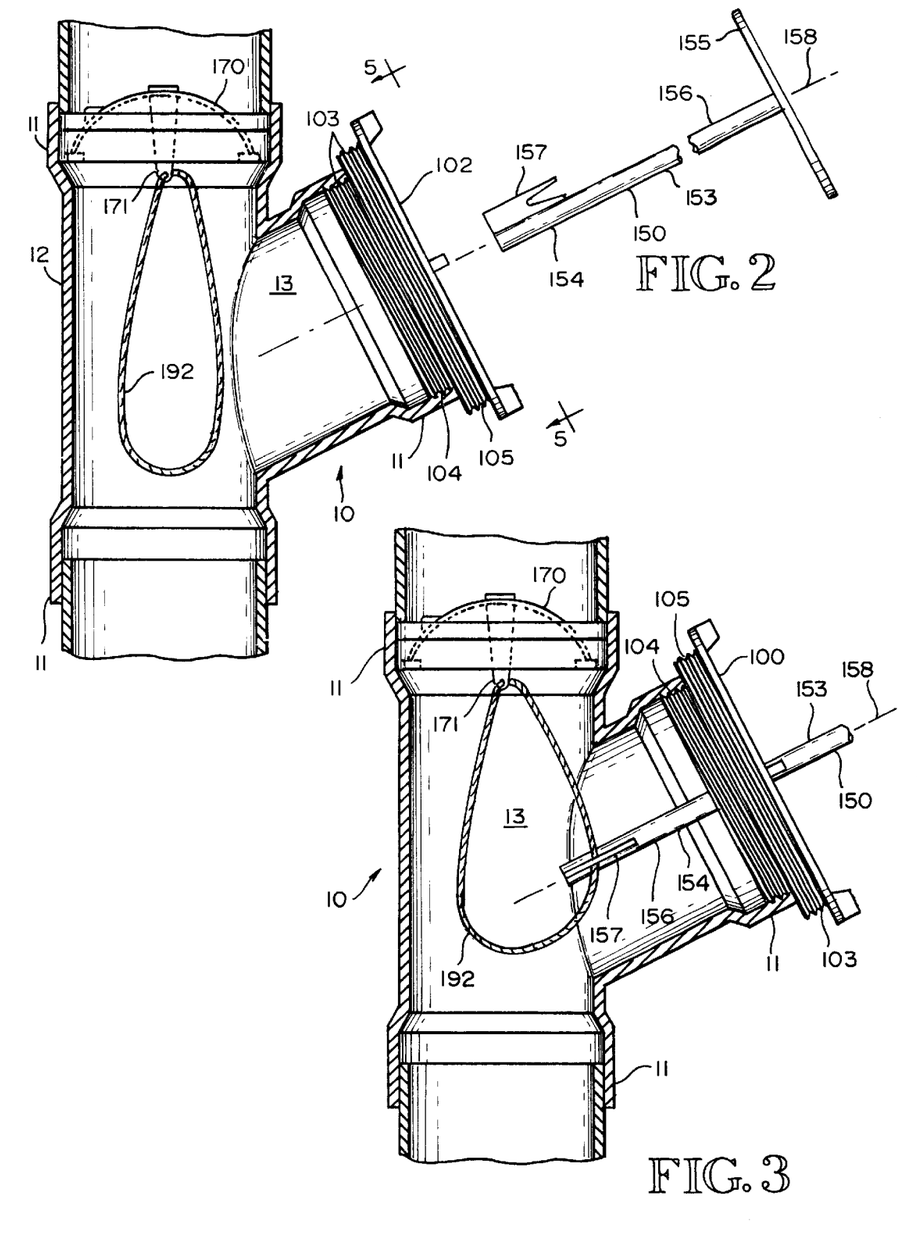
FIG. 2 is a cutaway schematic view of a preferred embodiment of an apparatus for unseating a test baffle according to the invention, with a removal tool positioned outside the plug aperture.
FIG. 3 is a cutaway schematic view of the apparatus of FIG. 2, with the removal tool positioned with the plug aperture and in engagement with a removal device attached to a test baffle.
Figures 7, 8A, 8B:
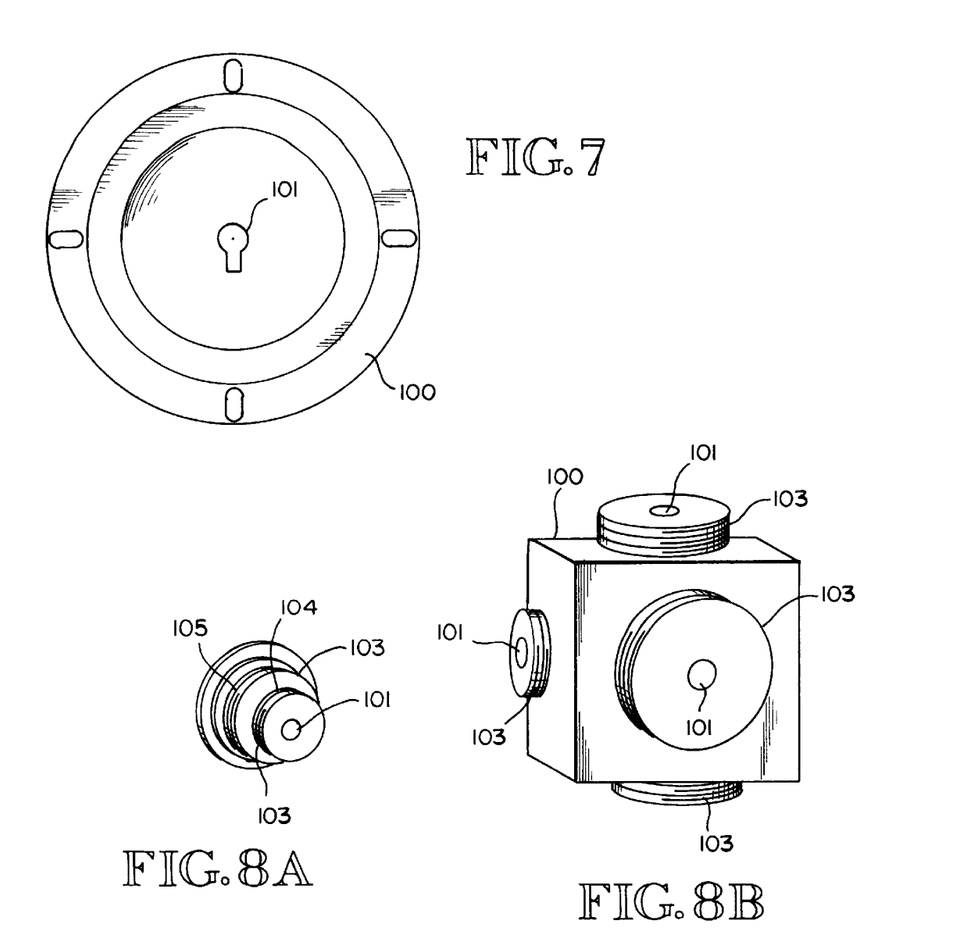
FIG. 7 is a plan view of a preferred embodiment of a plug according to the invention.
FIGS. 8a, 8b, and 8c are perspective views of alternative embodiments of test plugs according to the invention.

FIG. 2 is a cutaway schematic view of a preferred embodiment of an apparatus for unseating a test baffle according to the invention, with a removal tool positioned outside the plug aperture. In the embodiment shown in FIGS. 2–4, removal device 150 comprises a removal tool 153 having first end 154 and second end 155. The tool is adapted to pass through aperture 101 by appropriate shaping of the tool, and in particular the first end of the tool. In the embodiment shown tool 153 comprises body 156 and hook 157, which is attached to the body, giving the removal tool what might generally be described as a "key shape". By shaping aperture 101 as shown in FIG. 7, first end may be readily accommodated. Removal tool 153 is configured so that the second end may be used for manipulation of the first end when the tool is disposed within the aperture, whereby the first end may be manipulated into engagement with the test baffle, so as to dislodge it. In the embodiment shown in FIGS. 2–4, the test baffle comprises loop 192, which is attached to attachment portion 171, shown in the form of a lug, on test baffle 170 and is comprised of string or cord. Thus one method of dislodging test baffle 170 is to insert removal tool 153 through aperture 101 (FIG. 2), manipulate first end 154 of the tool into engagement with the baffle by means of loop 192, as for example engaging the loop with hook 157 (FIG. 3), and to rotate tool 153 about tool longitudinal axis 158 (as for example in the direction of arrow 159 in FIG. 4) until all slack has been removed from the loop (FIG. 4), and then to pivot the tool about an edge of aperture 101, in the direction of arrows 160 in FIG. 4, to unseat the baffle and to allow test fluids to bleed out of the test portion of the conduit. Again, after the test pressure has bled off plug 100 may be removed, and with it the test baffle. A permanent cap or conduit extension may then be installed in place of the test plug.

Figure 4:
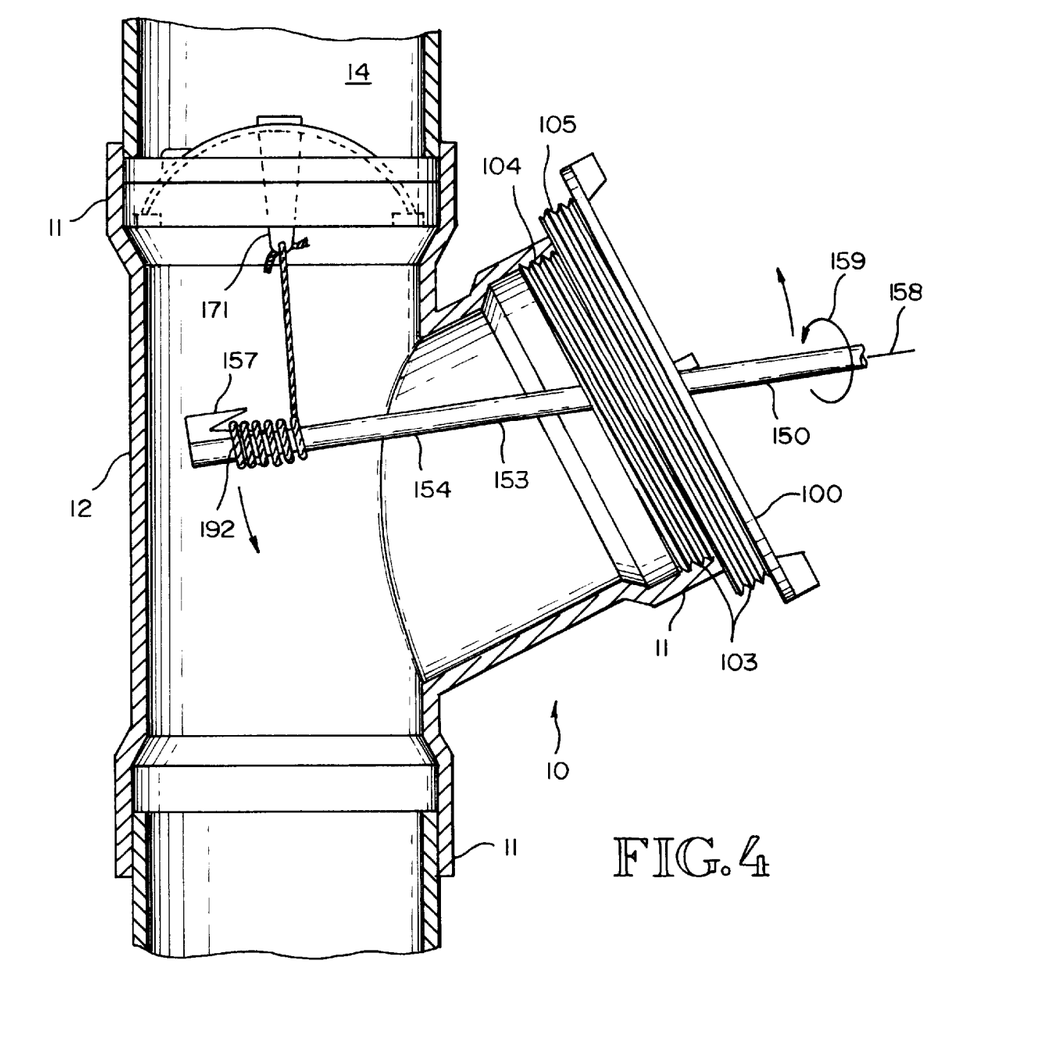
FIG. 4 is a cutaway schematic view of the apparatus of FIG. 2, with the removal tool in position to collapse and unseat the test baffle.

In the configuration depicted in FIGS. 2–4, test portion 14 of conduit 12 is in a portion of the conduit separated from plug 101 by baffle 170. Thus during the fluid test no test fluid is retained by plug 100. However, when baffle 170 has been dislodged or unseated following pressure testing, plug 100 provides protection against unwanted fluid escape while fluids bleed out of the test portion. In configurations of this type the addition of an optional skirt 190 may be of great advantage.

Figure 5:
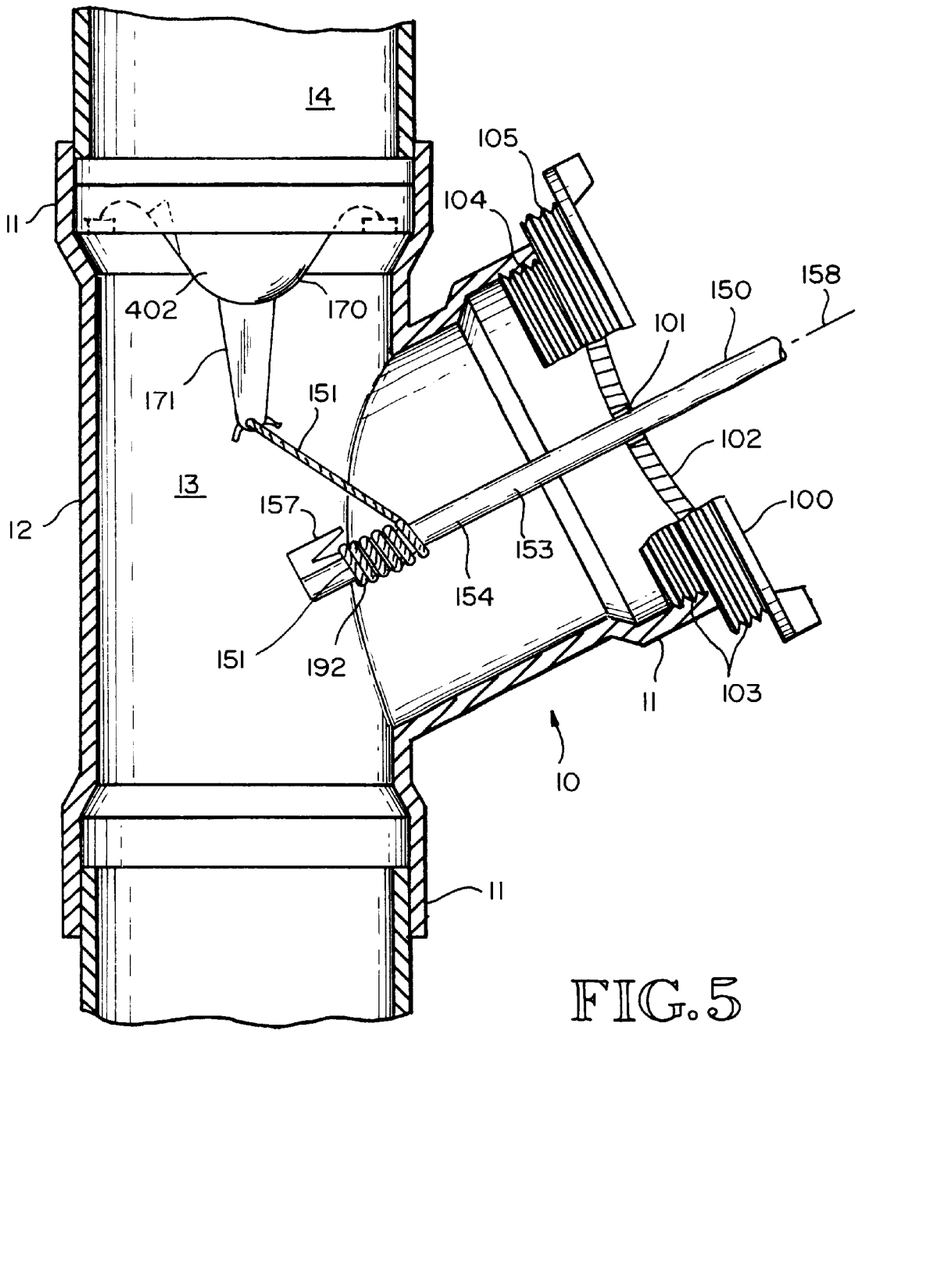
FIG. 5 is a cutaway schematic view of the apparatus of FIG. 2, with the test baffle dome collapsed and the test baffle ready for unseating.
Figure 6:
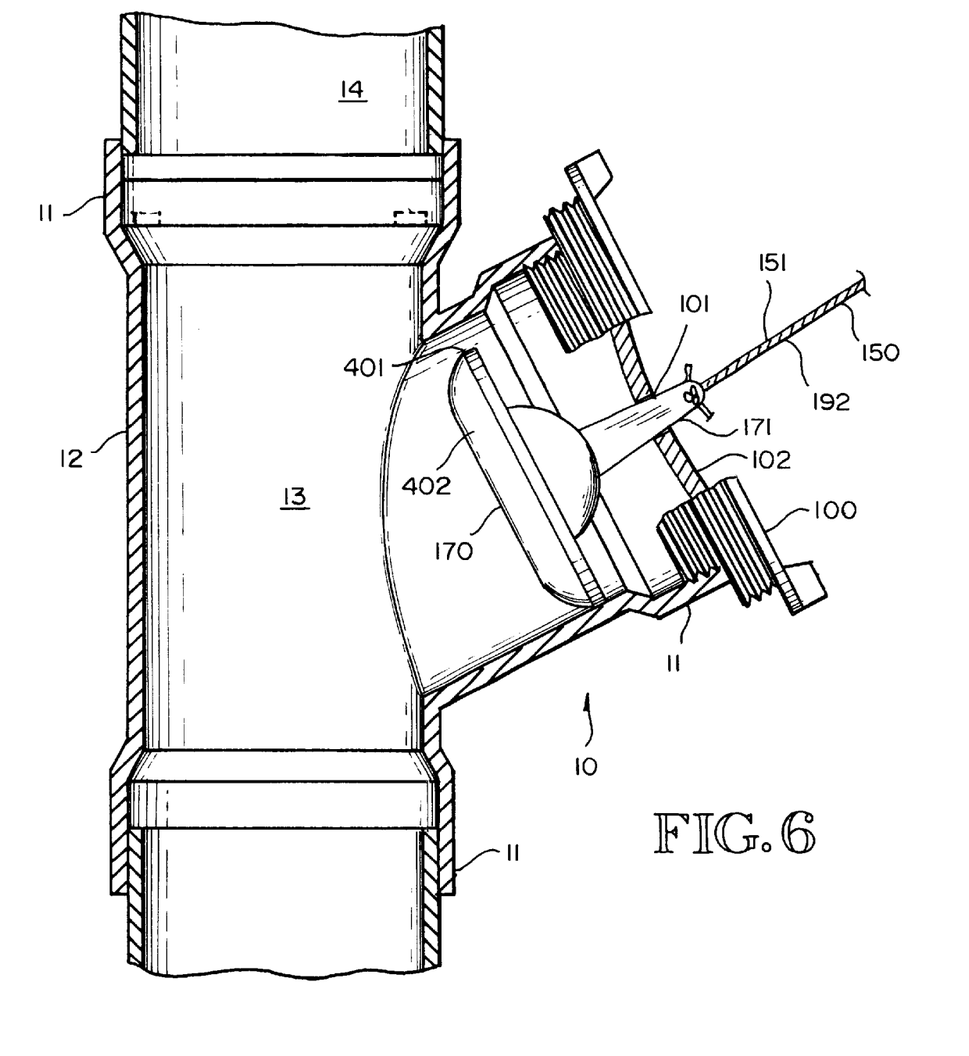
FIG. 6 is a cutaway schematic view of the apparatus of FIG. 2, with the test baffle unseated and the test fluid freed for draining.

A particularly effective way of preventing fluid leakage following removal of the test baffle has been found to include the provision of the baffle with an attachment portion, most preferably in the form of a lug, adapted to sealingly engage and therefore plug, substantially or completely, the aperture in the test plug, so as to entirely or substantially reduce leakage through the aperture as the test section drains. Such an arrangement is shown in FIGS. 2–6. Test baffle 170 comprises attachment portion 171, to which is attached cord loop 192 for removal by tool 150. After conduit 11, 12 has been tested, the baffle is unseated and the lug or attachment portion 171 pulled into aperture 101 until it has sealed the aperture to prevent or reduce fluid leakage, as shown in FIG. 6. A preferred configuration is to place the attachment portion or lug 171 on a concave side of the test baffle, so that as the baffle is removed by pulling on the removal line the baffle dome is collapsed, as shown in FIG. 5. Alternatively, the attachment portion could be placed at one side of the test baffle, so that a partial unseating of the baffle would result in a more gradual bleeding of pressure from the test portion of the conduit.

Figure 8C:
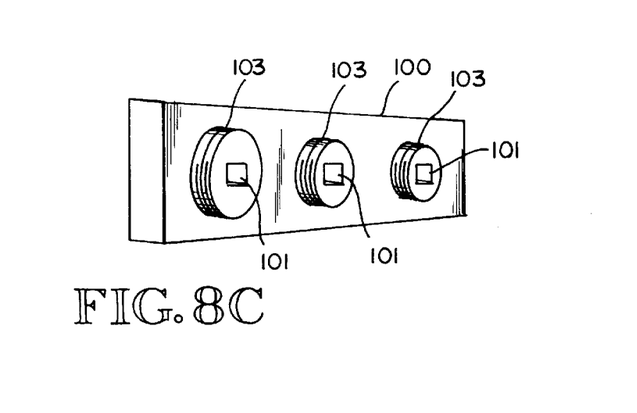
Figure 9:
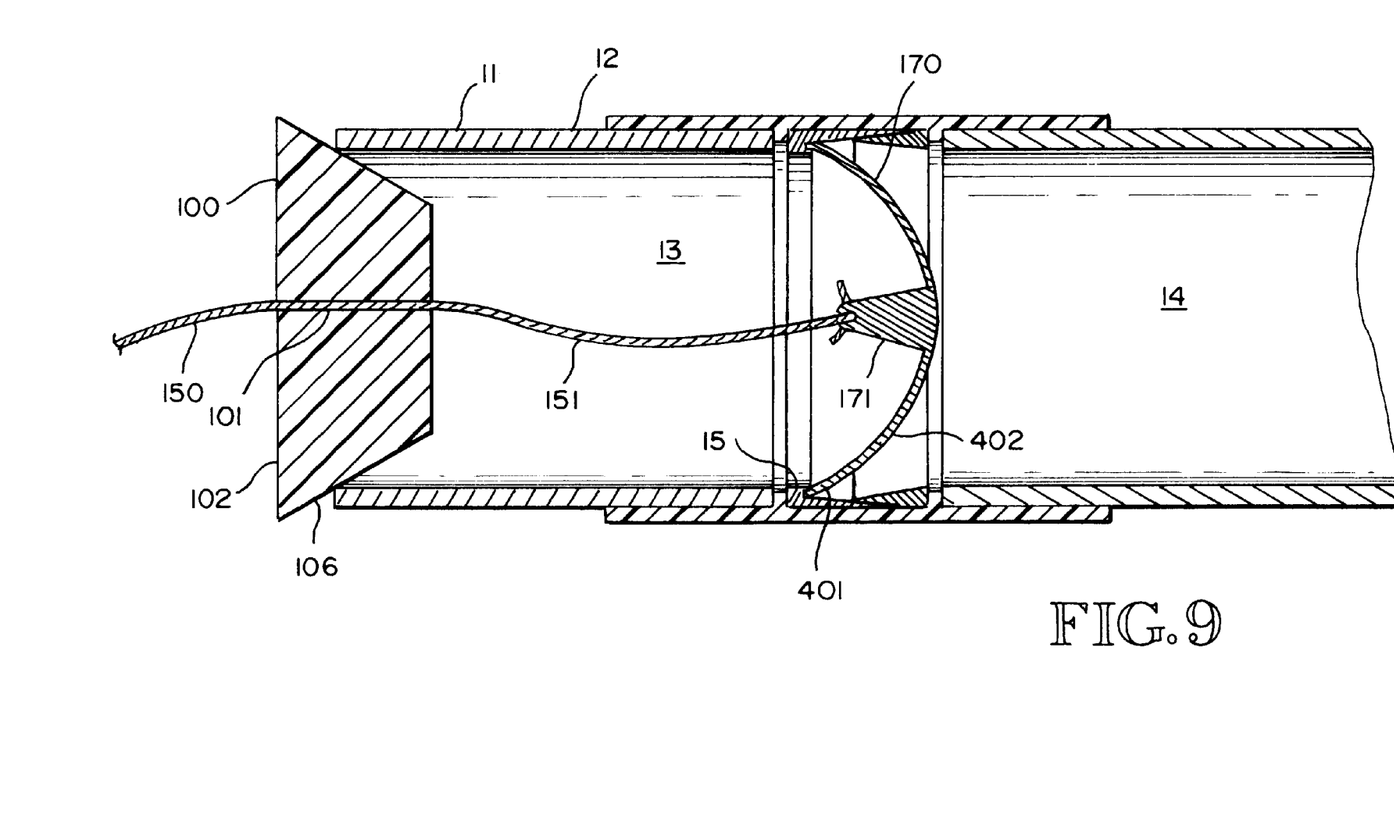
FIG. 9 is a cutaway schematic view of a preferred embodiment of an apparatus for unseating a test baffle according to the invention.

The operation of engaging conduits of various sizes by way of a test plug according to the invention may be seen by comparison of FIGS. 1a and 1b to FIGS. 2–4. In FIGS. 1a and 1b, test plug 100 engages conduit 12 by means of threaded portion 105, which is of greater diameter than threaded portion 104. In FIGS. 2–4, engagement is by relatively smaller threaded portion 104. Any number and combination of various thread and plug diameters may be used, according to the needs of the tester. For example, in the plumbing industry a single plug adapted for engagement of threaded pipes having inner diameters of 3½ and 4½ inches may be used to great advantage for the testing of building drain pipes. Alternative devices for providing a single plug with threaded portions of varying size are depicted in FIGS. 8a–8c. By appropriate rotation of test plug 100 a number of different conduit sizes may be accommodated. In FIG. 8a a triple-threaded, single axis configuration is shown; in the other Figures distinct threaded portions are attached to a single carriage. In each case aperture or apertures 101 pass entirely through the plug structure and thus communicate between an outer surface of the plug and the interior of the conduit to which the plug is attached. An alternative means of adapting test plug 100 for sealing engagement of conduits of different sizes is shown in FIG. 9. In FIG. 9 plug 100 is provided with frusto-conical exterior surface 106 sized to engage the substantially circular ends of a variety of sizes of conduits. By fabricating the plug from an appropriately flexible material, sealing engagement of any of a wide variety of sized conduits may very easily be achieved. For example, making such a plug of natural or synthetic rubber would permit the plug to be inserted in a conduit in the manner of a cork, providing a very effective, easily dismantled seal for the conduit. Many other ways of adapting the plug for the engagement of a variety of conduit sizes will occur readily to those of ordinary skill in the design of such systems.

EXAMPLE 1

A test plug is sealably engaged in a plumbing drain system in a building in the manner shown in FIGS. 1a and 1b. A test plug is threaded into a 3.5 inch diameter end of a Y-connection following installation of a test baffle and attachment of a removal line, which is passed through an aperture in the test plug and an attached leakage skirt. The test portion of the fluid conduit is filled with water and checked for leaks. After the fluid tight integrity of the light has been assured, the removal line attached to the test baffle is pulled until the perimeter of the test baffle is unseated from the interior of the conduit. Water in the test portion of the conduit is allowed to drain, whereupon the test plug is removed, the test baffle is removed, and a permanent cap is placed on the Y-connection.

EXAMPLE 2

A test plug is sealably engaged in a plumbing drain system in a building in the manner shown in FIGS. 2 through 6. A test plug is threaded into a 4.5 inch diameter end of a Y-connection following installation of a test baffle and its attached removal loop. The test portion of the fluid conduit is filled with water and checked for leaks. After the fluid tight integrity of the light has been assured, a removal tool is passed through an aperture in the test plug and manipulated into engagement of the removal loop. The tool is rotated about its longitudinal axis until all slack has been removed from the removal loop, whereupon the tool is pivoted about an edge or rim of the aperture, with the first end of the removal tool being rotated in a direction substantially directly away from the test baffle, so that the test baffle is collapsed and unseated. As water begins to drain from the test section, the attachment portion to which the removal loop is attached is pulled into the aperture until the aperture is substantially sealed, thus reducing leakage through the aperture, and water is allowed to drain from the test section. The test plug is removed, the test baffle is removed, and a permanent cap is placed on the Y-connection in place of the test plug.

The various components of the invention may be made from any material having qualities suitable for meeting the purposes suggested herein. It has been found particularly both economically and functionally advantageous, however, in building plumbing lines intended for draining wastewater, to fabricate conduit sections and baffle carriages from injection molded styrene, acrylonitrile butadiene styrene (ABS), polyvinyl chloride (PVC), and other common building plumbing materials. Test baffles and sleeves, including sleeves adapted to perform the function of the baffle carriage, are advantageously constructed of suitably strong but flexible materials such as natural or synthetic rubber or other suitable polymer.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention finds applicability in the isolation and interconnection of fluid transfer lines such as vent and wastewater systems where pressure testing of portions of the fluid line is required or useful.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. Apparatus for dislodging a test baffle in a fluid conduit, the apparatus comprising:
   a plug adapted for sealing engagement of an end of a fluid conduit, the plug comprising an aperture communicating between an outer surface of said plug and an interior of said conduit and being adapted for sealing engagement of a plurality of conduits, said conduits of differing inside diameter; and
   a removal device adapted to pass through said aperture and to engage a test baffle disposed within an interior of said fluid conduit.

2. The apparatus of claim 1, wherein said removal device comprises a flexible line attached to a test baffle.

3. The apparatus of claim 1, wherein:
   said removal device comprises a tool having first and second ends and adapted to pass through said aperture, said first end comprising a device for engaging a test baffle disposed within an interior of said fluid conduit and said second end adapted for manipulation of the first end when the tool is disposed within said aperture;
   whereby the first end of the removal tool maybe manipulated into engagement with said baffle when the baffle is installed within said interior, and the baffle may be dislodged from the conduit.

4. The apparatus of claim 3, wherein:
   said tool comprises a longitudinal axis and is adapted for rotation thereabout within said aperture, and further comprises a hook adapted for engagement of a line attached to a test baffle;
   whereby said tool may be rotated about said longitudinal axis in order to remove a slack from said line prior to dislodgment of said baffle.

5. The apparatus of claim 3, wherein the first end of said removal tool comprises a hook.

6. The apparatus of claim 5, wherein
   said tool comprises a longitudinal axis and is adapted for rotation thereabout, and further comprises a hook adapted for engagement of a line attached to a test baffle;
   whereby said tool may be rotated about said longitudinal axis in order to remove a slack from said line prior dislodgment of said baffle.

7. The apparatus of claim 1, further comprising
   a skirt adapted to provide a seal between said plug and said removal tool.

8. The apparatus of claim 1, wherein said plug is adapted for sealing engagement of a plurality of conduits, said conduits of differing inside diameter.

9. A method for dislodging a test baffle in a fluid conduit, the method comprising the steps of:
   substantially sealing an end of a fluid conduit with a plug;
   passing a removal tool through an aperture communicating between an outer surface of said plug and an interior of said conduit, and into said interior of said fluid conduit;
   manipulating a first end of the removal tool, by means of a second end of the removal tool, into engagement with a removal device of a test baffle installed within said interior, said removal device comprising a loop; and,
   dislodging said baffle from the conduit with said removal tool wherein said removal tool comprises a device for engaging said loop, the method further comprising the step of rotating the removal tool to wind a portion of said loop about the tool so as to reduce an effective length of the loop.

10. The method of claim 9, wherein said removal device comprises a lug and said removal tool comprises a hook, said engagement comprising the passing an end of said hook through said lug.

11. The method of claim 9, wherein said removal device comprises a loop and said removal tool comprises a device for engaging said loop, the method comprising the step of rotating the removal tool to wind a portion of said loop about the tool so as to reduce an effective length of the loop.

12. The method of claim 9, including the step of breaching a seal between said baffle and said conduit to release a pressure within said conduit contained by said baffle.

13. A method for dislodging a test baffle in a fluid conduit, the method comprising the steps of:
   substantially sealing an end of a fluid conduit with a plug;
   passing a removal device comprising a line through an aperture communicating between an outer surface of said plug and an interior of said conduit, and into said interior of said fluid conduit, said removal device attached to a test baffle; and
   dislodging said baffle from the conduit with the removal device.

14. The method of claim 13, wherein said removal device comprises a slack and dislodgement of said baffle comprises at least partly a step of taking up said slack with a rod.

15. The apparatus of claim 1, wherein said aperture is adapted to receive in sealing engagement an attachment portion of a test baffle.

16. The apparatus of claim 1, further comprising a test baffle having a attachment portion adapted for sealing engagement of said aperture.

17. The apparatus of claim 16, wherein said attachment portion is attached to said removal device and is adapted to sealingly engage said aperture upon being drawn into said aperture by said removal device.

18. A plug for use in testing a fluid conduit, the plug adapted for sealing engagement of an end of a fluid conduit, the plug comprising an aperture communicating between an outer surface of said plug and an interior of said conduit and being adapted for sealing engagement of a plurality of conduits, said conduits of differing inside diameter, said aperture adapted to receive in sealing engagement an attachment portion of a test baffle.

19. A test baffle for use in testing a fluid conduit, the baffle comprising:
   a perimeter adapted to engage an interior of a fluid conduit; and
   an attachment portion, the attachment portion adapted for attachment of a removal device and for sealing engagement of an aperture in a test plug.

20. The baffle of claim 19, further comprising a web.

21. The baffle of claim 20, wherein said web is concave.

* * * * *